July 27, 1937.　　　C. J. FITZGERALD　　　2,088,509
VALVE
Filed June 29, 1936
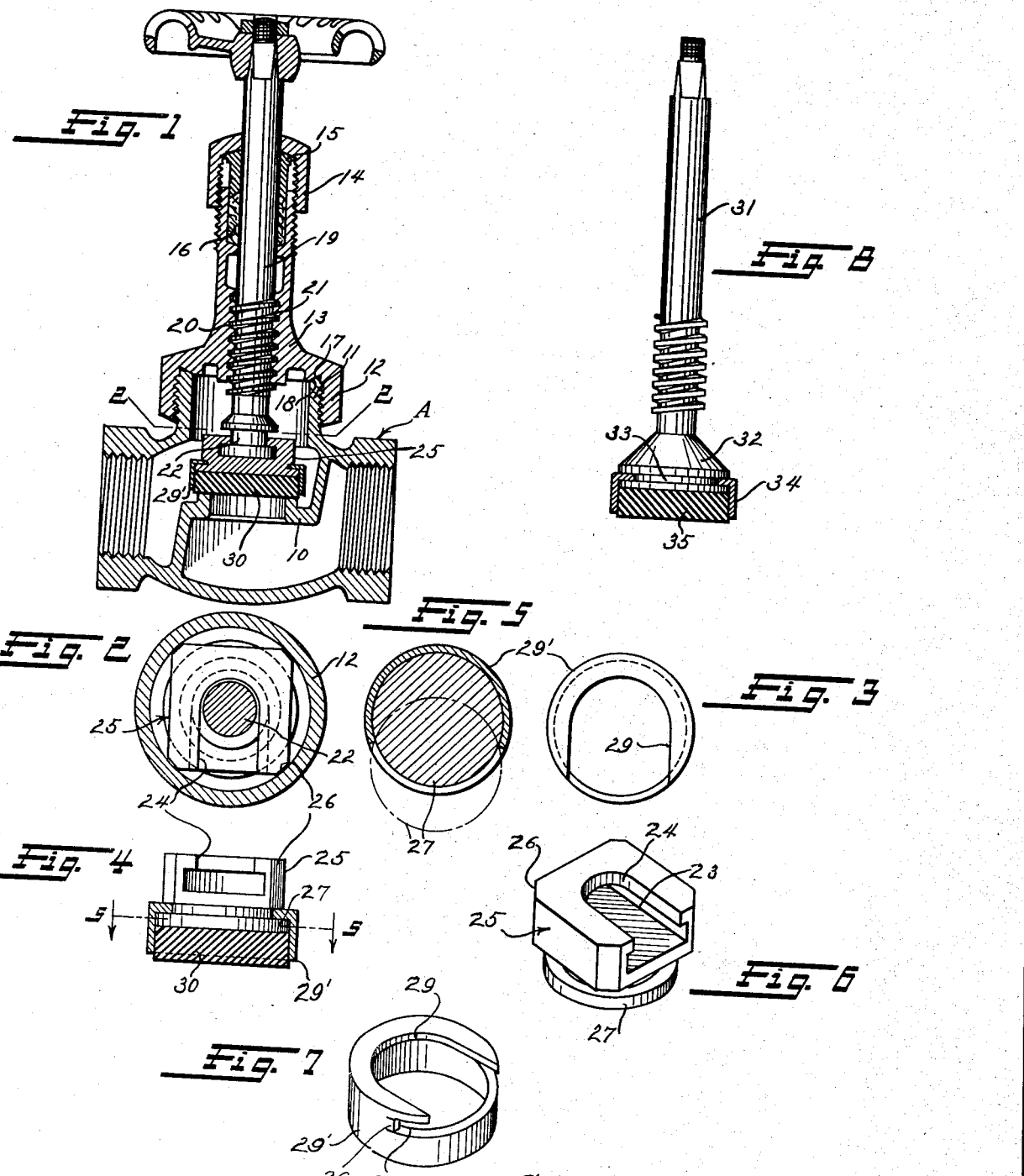
C. J. Fitzgerald
INVENTOR
BY Victor J. Evans & Co.
ATTORNEYS Patented July 27, 1937

2,088,509

UNITED STATES PATENT OFFICE 2,088,509

VALVE

Carl J. Fitzgerald, Louisville, Ky.

Application June 29, 1936, Serial No. 88,011

1 Claim. (Cl. 251—46)

The invention relates to disk retainers and pilots for use with renewable disk type valves.

The primary object of the invention is the provision of a structure of this character, wherein it is possible for the quick change of the disk in renewing disk valves which can be had through the instrumentality of a retainer which carries a disk and when a new disk is necessary the retainer is discarded with the disk and a new assembly thereof is applied thus rendering the valve further serviceable.

Another object of the invention is the provision of a structure of this character, wherein a valve disk can be applied with dispatch and without the aid of tools in that the application of the valve can be had by hand as the retainer for the disk is of the snap-on type.

A further object of the invention is the provision of a structure of this character, which is extremely simple in its make-up, thoroughly reliable and effective in its operation, assuring quick renewing of valve disks, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a vertical sectional view through a typical valve with the device associated therewith and constructed in accordance with the invention.

Figure 2 is a sectional view on the line 2—2 of Figure 1.

Figure 3 is a top plan view of the retainer for a valve disk.

Figure 4 is an elevation partly in section of the pilot and retainer with the valve disk in place.

Figure 5 is a sectional view on the line 5—5 of Figure 4.

Figure 6 is a perspective view of the pilot.

Figure 7 is a perspective view of the valve disk retainer.

Figure 8 is an elevation partly in section of a modified form of valve stem showing the retainer applied with the pilot deleted.

Similar reference characters indicate corresponding parts throughout the several views in the drawing.

Referring to the drawing in detail, A designates generally a portion of the valve casing of the globe type and interiorly of this casing is the usual valve seat 10. As is customary the valve casing is formed with an annular neck 11 which is exteriorly threaded to engage the internally threaded skirt 12 of a bonnet 13. This bonnet is externally threaded on its upper end to receive the internally threaded cap 14 engaging the usual follower 15 to compress the packing 16 between the interior of the neck of the bonnet and the valve spindle or stem as is usual in valves of this type.

The upper edge or rim of the neck 11 is formed with an inwardly and downwardly beveled surface 17 adapted to be engaged by a complementary shoulder 18 formed on the underface of the bonnet 13. The purpose of these coacting beveled surfaces is to provide an additional seal between the bonnet and the neck of the casing when the said bonnet is screwed home.

The spindle or stem 19 is provided with screw threads 20 which engage the interior threads 21 in the bonnet, the lower inner end of the stem being formed with a head 22 accessible through an open-sided slot 24 provided within a pilot 25. The pilot 25 is preferably of substantially square formation having beveled corners 26 so that this pilot will be guided and properly centered within the neck 11 of the casing A. The valve in its assembly is of the conventional type and is merely shown and described for the purpose of illustrating the application and use of the valve disk retainer and pilot constituting the present invention, the valve disk retainer being hereinafter fully set forth.

The pilot 25 is readily attached to and removed from the head 22 of the spindle or stem 19 and when attached and within the casing A there is no liability of separation of the pilot from the spindle or stem when the latter is operated for the opening and closing of the valve.

The pilot 25 at its underside is formed with an annular flange or rim 27 which is adapted to be accommodated through a mouth 28 of an open-sided slot 29 formed in a retaining ring 29' accommodating therein a valve disk 30. In this manner the valve disk 30 is replaceably held with the pilot 25 and such disk is adapted to be engaged with the seat 10 in the valve casing A when the valve is closed.

In Figure 8 of the drawing there is shown a slight modification wherein the stem or spindle 31 is formed at its inner or lower end with a flared circular head 32 having a peripheral annular channel or groove 33 so that the retainer ring 34 which is identical to the ring 29' can be separably attached to this head 32 for the fitting of the valve disk 35 therewith.

With reference to the rings 29' and 34 it will be noted with respect to the ring 29' that the mouth 28 is of a size slightly less than the widest diameter of the pilot 25 at the area thereof engaged by said retainer ring 29' so that this retainer can be snapped onto and from the pilot and when upon the pilot will be frictionally held engaged thereon. In fact, the opposite extremities of the mouth 28 are so formed that each is in the nature of a springy terminal lip 36 adapted to crowd against the pilot at the point of engagement of the retainer ring therewith for the secure holding of the retainer upon the pilot yet permitting the snapping off of this retainer when it is required to renew a valve disk.

The pilot 25 is for replacement for valves now in use to obtain the quick change effect where a new stem is not necessary.

The valve disk is a solid composition to meet the condition for which it is to be used.

The bore of the retainer is the same as the diameter of the bottom flange of the stem 31 and such retainer has more than one-half of its circumference present causing a springing action when pressed over the flange of the stem 31 and holds the retainer 34 securely in place. This retainer will not come off until sufficient pressure is applied to remove it for the replacement of a new disk 35 when the occasion requires.

The essentials of the invention are in the making of the pilot and the retainer with a horseshoe shaped end for the snapping on and snapping off of these parts in and from place for use in a valve.

What is claimed is:

A disk retainer for spigots having a valve spindle and a neck body, comprising a pilot of substantially square formation provided with a slot in its top and opening through one side for releasably accommodating the spindle and also having beveled corners for the accommodating of said pilot within the neck body and the guiding of said pilot on manipulation of the spindle, opposed flanges on the pilot at its top and overhanging the slot except at its open side for interconnecting the pilot and said spindle, an annular flange formed on the bottom of said pilot, a disk registering with the said annular flange, a retaining ring about the flange and disk and having a slot opening through one side thereof for the releasable engagement of said ring with the flange when the latter is inserted in the slot at the open side thereof, and flanges on the ring and overhanging the slot except at its open side and interconnecting the ring and pilot.

CARL J. FITZGERALD.